US007864435B2

(12) United States Patent
Rodriguez, Jr. et al.

(10) Patent No.: US 7,864,435 B2
(45) **Date of Patent: *Jan. 4, 2011**

(54) PROJECTION DISPLAY DEVICE FOR MULTIMEDIA AND WALL DISPLAY SYSTEMS

(75) Inventors: Ernesto M. Rodriguez, Jr., Austin, TX (US); Patricia M. Hughes, Round Rock, TX (US); William E. Haushalter, Spicewood, TX (US); Kai Chang Lu, Sutton Coldfield (GB)

(73) Assignee: 3M Innovative Properties Company, St. Paul, MN (US)

( * ) Notice: Subject to any disclaimer, the term of this patent is extended or adjusted under 35 U.S.C. 154(b) by 511 days.

This patent is subject to a terminal disclaimer.

(21) Appl. No.: 11/771,003

(22) Filed: Jun. 29, 2007

(65) Prior Publication Data

US 2007/0285624 A1 Dec. 13, 2007

Related U.S. Application Data

(63) Continuation of application No. 11/003,252, filed on Dec. 3, 2004, now Pat. No. 7,271,964.

(60) Provisional application No. 60/527,424, filed on Dec. 5, 2003, provisional application No. 60/556,612, filed on Mar. 26, 2004.

(51) Int. Cl.

| | |
|---|---|
| ***G02B 3/00*** | (2006.01) |
| ***G02B 9/00*** | (2006.01) |
| ***G02B 13/04*** | (2006.01) |
| ***G02B 13/18*** | (2006.01) |
| ***G02B 3/02*** | (2006.01) |

(52) U.S. Cl. ........................ 359/649; 359/753; 359/716

(58) Field of Classification Search ................ 359/649, 359/689, 716, 784, 786, 753, 754, 749
See application file for complete search history.

(56) References Cited

U.S. PATENT DOCUMENTS 4,070,098 A 1/1978 Buchroeder (Continued)

FOREIGN PATENT DOCUMENTS

DE 29 20 360 A1 11/1980

(Continued)

OTHER PUBLICATIONS

Stupp, E.H. & Brennesholtz, M.S.; Projection Displays; John Wiley & Sons Ltd. (1999); pp. 146-150 and 205-208.

(Continued)

*Primary Examiner*—Alicia M Harrington

(57) ABSTRACT

A front projection display device includes an optical engine including an illumination system, an imaging system, and projection optics. The projection optics include a first lens group of negative refractive power that has at least one aspheric surface. The projection optics output an image at a half field angle of at least 45°, where the image has substantially no distortion. For example, when the first lens group is placed at a distance of less than 1 meter from a viewing screen, the output image has a size of about 40 inches diagonal or greater, and requires substantially no keystone correction. In other aspects, the optical engine can be implemented in a wall-mounted projection system, a multimedia system, a compact integrated monitor system, and a portable projection unit.

28 Claims, 12 Drawing Sheets

U.S. PATENT DOCUMENTS

| | | | |
|---|---|---|---|
| 4,256,373 A | 3/1981 | Horimoto | |
| 4,908,705 A | 3/1990 | Wight | |
| 4,976,429 A | 12/1990 | Nagel | |
| 5,363,242 A | 11/1994 | Yokota et al. | |
| 5,390,048 A | 2/1995 | Miyatake et al. | |
| 5,442,484 A | 8/1995 | Shikawa | |
| 5,459,539 A | 10/1995 | Yamamoto | |
| 5,510,862 A | 4/1996 | Lieberman et al. | |
| 5,526,186 A | 6/1996 | Sekine | |
| 5,600,488 A | 2/1997 | Minefuji et al. | |
| 5,606,459 A | 2/1997 | Nakatsuji | |
| 5,625,495 A | 4/1997 | Moskovich | |
| 5,664,859 A | 9/1997 | Salerno et al. | |
| 5,870,228 A | 2/1999 | Kreitzer et al. | |
| 5,900,987 A | 5/1999 | Kreitzer | |
| 5,969,876 A | 10/1999 | Kreitzer et al. | |
| 5,978,150 A | 11/1999 | Hamanishi et al. | |
| 6,109,767 A | 8/2000 | Rodriguez | |
| 6,124,979 A | 9/2000 | Hirata et al. | |
| 6,137,638 A | 10/2000 | Yamagishi et al. | |
| 6,179,426 B1 | 1/2001 | Rodriguez, Jr. et al. | |
| 6,188,522 B1 | 2/2001 | Kimura et al. | |
| 6,188,523 B1 | 2/2001 | Choi | |
| 6,224,216 B1 | 5/2001 | Parker et al. | |
| 6,275,343 B1 | 8/2001 | Takamoto et al. | |
| 6,299,313 B1 | 10/2001 | Hirata et al. | |
| 6,334,687 B1 | 1/2002 | Chino et al. | |
| 6,439,726 B1 | 8/2002 | Piehler | |
| 6,476,981 B1 | 11/2002 | Shikama | |
| 6,540,366 B2 | 4/2003 | Keenan et al. | |
| 6,542,308 B2 | 4/2003 | Hirata et al. | |
| 6,542,316 B2 | 4/2003 | Yoneyama | |
| 6,560,041 B2 | 5/2003 | Ikeda et al. | |
| 6,578,999 B2 | 6/2003 | Schmidt et al. | |
| 6,580,469 B1 | 6/2003 | Rieche et al. | |
| 6,604,829 B2 | 8/2003 | Rodriguez, Jr. | |
| 6,624,952 B2 | 9/2003 | Kuwa et al. | |
| 6,896,375 B2 | 5/2005 | Peterson et al. | |
| 6,937,401 B2 | 8/2005 | Sugano | |
| 6,962,417 B1 | 11/2005 | Teng et al. | |
| 6,975,460 B2 | 12/2005 | Ikeda et al. | |
| 7,009,765 B2 | 3/2006 | Gohman | |
| 7,123,426 B2 * | 10/2006 | Lu et al. | 359/750 |
| 7,126,767 B2 | 10/2006 | Lu | |
| 7,150,537 B2 | 12/2006 | Peterson et al. | |
| 7,271,964 B2 * | 9/2007 | Rodriguez et al. | 359/750 |
| 2002/0057505 A1 | 5/2002 | Sato | |
| 2002/0060859 A1 | 5/2002 | Yoneyama | |
| 2002/0154418 A1 | 10/2002 | Shikama | |
| 2003/0137744 A1 | 7/2003 | Kuwa et al. | |
| 2003/0231261 A1 | 12/2003 | Bassi et al. | |
| 2004/0080720 A1 | 4/2004 | Saito | |
| 2004/0223123 A1 | 11/2004 | Engle et al. | |
| 2004/0233394 A1 | 11/2004 | Gohman | |
| 2005/0083486 A1 | 4/2005 | Johnson | |
| 2005/0105055 A1 | 5/2005 | Olson et al. | |
| 2005/0122484 A1 | 6/2005 | Rodriguez, Jr. et al. | |
| 2007/0201005 A1 | 8/2007 | Rhodes et al. | |

FOREIGN PATENT DOCUMENTS

| | | |
|---|---|---|
| DE | 103 07 740 A1 | 9/2004 |
| JP | 62-201737 U | 12/1987 |
| JP | 02-027390 U | 2/1990 |
| JP | 02-196230 A | 8/1990 |
| JP | 02-230288 A | 9/1990 |
| JP | 03-027085 A | 2/1991 |
| JP | 03-056951 A | 3/1991 |
| JP | 07-151971 | 6/1995 |
| JP | 10-206969 A | 8/1998 |
| JP | 2002-082387 | 3/2002 |
| JP | 2003-015221 | 1/2003 |
| JP | 2003-057545 | 2/2003 |
| JP | 2003-330108 | 11/2003 |
| JP | 2004-245893 | 9/2004 |
| WO | WO 97/16927 | 5/1997 |
| WO | WO 00/67059 | 11/2000 |
| WO | WO 2004/109365 | 12/2004 |

OTHER PUBLICATIONS

Product Brochure, "Display Technologies by Carl Zeiss", Carl Zeiss Jena GmbH, Jena, Germany (date unknown).

* cited by examiner

PROJECTION DISPLAY DEVICE FOR MULTIMEDIA AND WALL DISPLAY SYSTEMS

CROSS REFERENCE TO RELATED APPLICATIONS

This application is a continuation of U.S. application Ser. No. 11/003,252, now allowed, filed Dec. 3, 2004 now U.S. Pat. No. 7,271,964, which claims priority to U.S. Provisional Patent Application No. 60/527,424, filed Dec. 5, 2003, and to U.S. Provisional Patent Application No. 60/556,612, filed Mar. 26, 2004, the disclosures of which are incorporated by reference in their entirety herein.

FIELD OF INVENTION

The present invention relates to a projection display device for use in a short throw distance, front projection display system for multimedia and wall display applications. In particular, the present invention relates to a projection device that provides a wide-angle projection lens that allows for extreme, off-axis image production and produces an image that is substantially distortion free and requires little to no keystone correction.

BACKGROUND

Electronic or video display systems are devices capable of presenting video or electronic generated images. Whether used in home entertainment, advertising, videoconferences or group conferences, the demand exists for an appropriate display device.

Image quality is one of the factors consumers use to determine the appropriate display device. In general, image quality can be determined qualitatively by factors such as image resolution and image color. As the desire by some consumers is for display devices having larger picture size, image quality can suffer. Typically, a large picture size is one that exceeds about 40 inch screen size as measured along the diagonal of the screen.

While many display devices are available on the market today in front projection systems, there is a continuing need to develop other devices.

SUMMARY

An embodiment of the present invention comprises a front projection display device. The display device includes an optical engine including an illumination system, an imaging system, and projection optics. The projection optics include a first lens group of negative refractive power that has at least one aspheric surface. The projection optics output an image at a half field angle of at least 45°, where the image has substantially no distortion. For example, when the first lens group is placed at a particular distance from a viewing screen, the ratio of this distance to the output image size (diagonal) is about 1 to 1.8-2.2. The output image can have a size of about 25 inches diagonal or greater. Also, in preferred aspects, the device does not require substantial keystone correction.

In other aspects of the present invention, the optical engine can be implemented in a wall-mounted projection system, a multimedia system, and a compact integrated monitor system.

The optical system of the present invention is used in a short throw distance, extreme off-axis, front projection system. The term "throw distance" means the distance defined by the normal from the projection screen to the projection lens. The phrase "short throw distance" means a distance of less than one meter. The term "extreme off-axis" means the projected image subtends an angle of greater than 45 degrees. In addition, the projection device projects an image having substantially no distortion. By substantially no distortion, it is meant that the distortion is no greater than 2%. In preferred aspects, the distortion is less than or equal to 1%, most preferably less than or equal to 0.5%. At these distortion values, for at least most imaging applications, no electronic distortion correction is required. In this document, the term "about" is presumed to modify all numerical values.

The above summary of the present invention is not intended to describe each illustrated embodiment or every implementation of the present invention. The figures and the detailed description that follows more particularly exemplify these embodiments.

Figure 1:
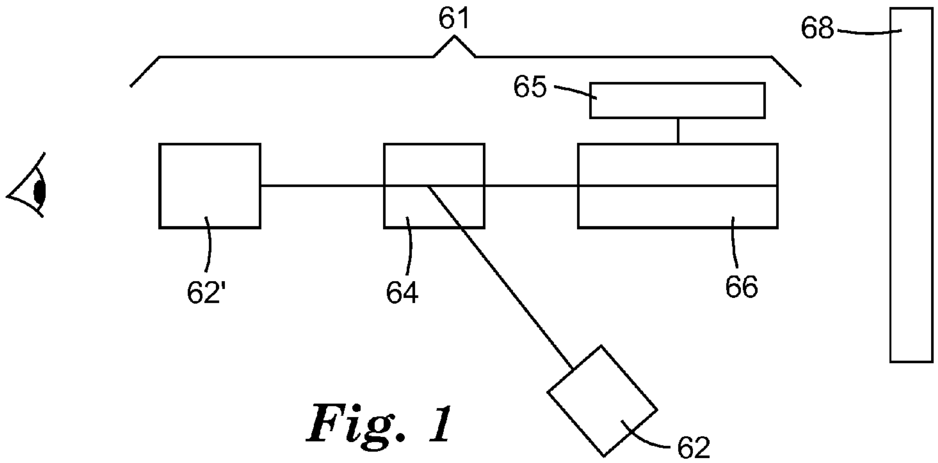
FIG. 1 is a schematic representation of an exemplary optical engine that can be used in the present invention.

These figures are not drawn to scale and are intended only for illustrative purposes. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention relates to a projection display device for use in a short throw distance, front projection display system for multimedia and wall display applications. In particular, the optical engine described herein can be utilized in a front projection system that is adapted for use in, for example, an integrated multimedia system, a wall-mounted projection system, and a monitor system. In addition, the optical engine described herein is substantially distortion free and requires substantially no keystone correction.

FIG. 1 shows a schematic representation of exemplary optical engine 61 having one or more of the following components: illumination system 62 or 62', imaging system 64, a focus mechanism 65, and projection optics 66. While two different illumination systems 62 and 62' are shown, typically only one is used. When the illumination system lies in position depicted by reference number 62, the imager used is a reflective imager. In contrast, when the illumination system lies in position depicted by reference number 62', the imager used is a transmissive imager. The optical engine generates an image on projection screen 68 or a viewing surface. Because the viewer and the optical engine are on the same side of the projection screen, FIG. 1 depicts a front projection display system using optical engine 61. Each element in the optical engine is discussed in detail below.

The illumination system 62, 62' can include a lamp unit, a filter (such as an infrared light and/or a ultraviolet light rejection filter), a color separation means, and an integrator. In one exemplary embodiment, the lamp unit includes a reflector and a lamp. Suitable, commercially available lamps include (i) Philips UHP type lamp unit, which uses an elliptic reflector, from Philips Semiconductors, Eindhoven, The Netherlands and (ii) OSRAM P-VIP 250 lamp unit from OSRAM GmBH, Munich, Germany. Other suitable lamps and lamp unit arrangements can be used in the present invention. For example, metal halide lamps or tungsten halogen lamps or light emitting diodes (LED's) can be used. The type of filter, color wheel, and integrator that can be used in embodiments of the present invention are not critical. In one exemplary embodiment, the color separation means is a spinning red/green/blue (RGB) color sequential disc in the light source of the imager. An illustrative commercially available color wheel is the UNAXIS RGBW color wheel, from UNAXIS Balzers, LTD, Balzers, Liechtenstein. A liquid crystal RGB color sequential shutter can also be used in embodiments of the present invention. An illustrative commercially available integrator is a hollow tunnel type integrator from UNAXIS Balzers LTD.

The imaging system 64 can include an imager and typically can also include conventional electronics. A useful reflective imager that can be used in the present invention is a XGA digital micromirror device (DMD) having a diagonal dimension of about 22 mm, available from Texas Instruments, Dallas, Tex. Alternatively, a transmissive or reflective liquid crystal display can be used as the imager. In exemplary optical engine embodiments, the surface of the imager is positioned substantially parallel to the surface of the projection screen.

The focusing mechanism 65 can be accomplished by mounting one or more of the lenses described below on a slidable or threaded mount (not shown), which can be adjusted manually by hand or through the use of an electronic actuation mechanism. For example, focusing can be accomplished by using a varifocal or a zoom lens. Alternatively, no user focus is required for projection units having a predetermined fixed position established between the optical engine 61 and the viewing screen 68.

The screen 68 may comprise a multi-layer material, for example, a plurality of Fresnel elements configured as is described in U.S. Pat. No. 6,179,426. The screen can be designed to control light distribution spreading in the horizontal direction to accommodate viewers who are positioned horizontally in front of the screen. Alternative embodiments of the screen may comprise multi-layer film technology, Dual Brightness Enhancement Film (DBEF) technology, or VIKUITI™ technology, all available from 3M Company, Saint Paul, Minn. Optionally, the generated image can be viewed on any surface, e.g., a wall or other structure, or standard viewing screen.

Figure 2:
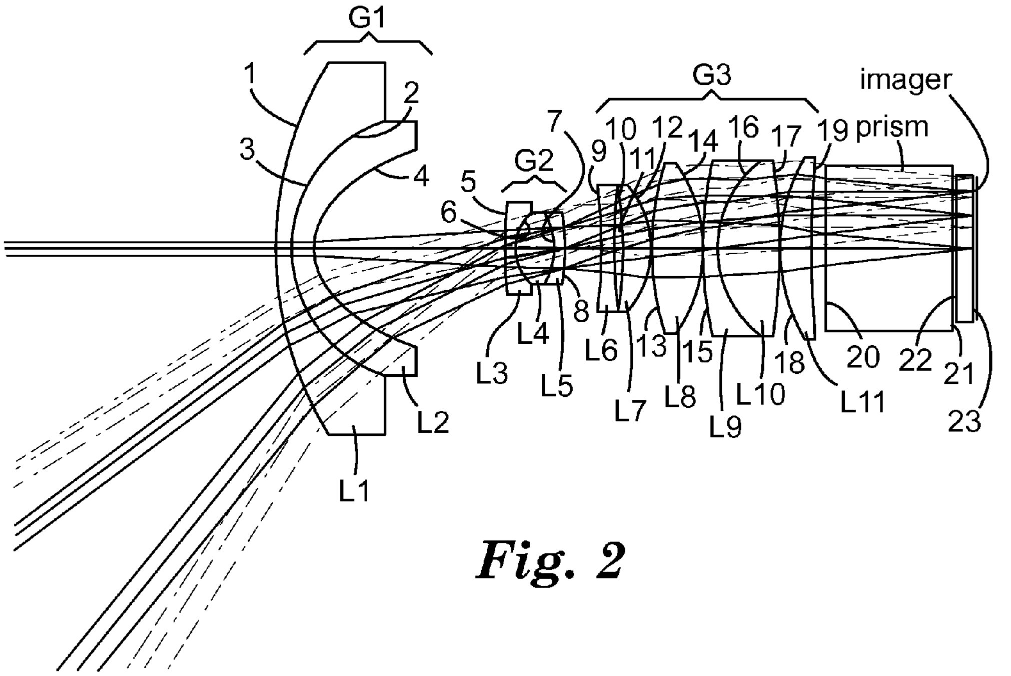
FIG. 2 is a schematic representation of an exemplary projection optics that can be used in the present invention.

FIG. 2 shows an exemplary embodiment of the projections optics (also referred to herein as a "projection lens" or a "wide-angle projection lens") of the optical engine 61. The projection optics of FIG. 2 include three lens groups in the following sequential order from a screen side: first lens group (G1), second lens group (G2), and third lens group (G3). The term "screen side" means that side of the projection lens closest to a projection screen. The three lens groups are discussed in detail below. As would be apparent to one of ordinary skill in the art given the present description herein, alternative constructions of projection lens 66 can be employed, including alternative constructions that include fewer, the same, or greater numbers of lens elements.

The exemplary projection lens of FIG. 2 includes a total of eleven (11) elements in the three lens groups, numbered from the screen side. The first lens group (G1) can include, in order from the screen side, a first lens element (L1) of negative refractive power and a second lens element (L2) having an aspheric surface on its second surface. Preferably, G1 is of negative refractive power. The ratio of $F_1/F$ in G1 can be such that $-3.5<F_1/F<-2.3$. The second lens group (G2) can include three lens elements, (L3) to (L5) inclusive, affixed or cemented together using a conventional adhesive. Preferably, G2 is substantially zero refractive power. In another embodiment, G2 can be slightly positive in refractive power. In another embodiment, it can be slightly negative in refractive power. The ratio of $F_2/F$ in G2 can be such that $-95<F_2/F<-86$. In this exemplary embodiment, the aperture stop lies within or near the second lens group G2. The third lens group (G3) can include six lens elements (L6) to (L11) inclusive. Preferably, G3 is of positive refractive power. The ratio of $F_3/F$ in G3 can be such that $2.5<F_3/F<3.2$. As shown in FIG. 2, a prism lies to the right of L11, i.e., furthest away from the projection screen. In the above description, F is the focal length of the wide-angle projection lens, $F_1$ is the focal length of the first lens group, $F_2$ is the focal length of the second lens group, and $F_3$ is the focal length of the third lens group.

In more detail, the first lens group G1 is preferably of negative refractive power. In a first embodiment, the first lens group G1 comprises a plurality of lens elements. For example, a first lens element (L1), lying closest to the screen, can have the largest diameter of all the lenses in the three lens groups. In one exemplary embodiment, the first lens element L1 in the first lens group has a sufficiently large diameter to project an image at a large field, i.e., at a half field angle greater than 45°, preferably greater than 50°, and most preferably about 55° in the direction of the screen, with substantially no distortion.

In another exemplary embodiment, the first lens element L1 in the first lens group has a diameter greater than 60 mm and less than 75 mm. In yet another exemplary embodiment, the first lens element of the first lens group has a diameter of about 70 mm. Thus, when implemented in a projection device, the first lens element can provide a field of view of about 110° to about 120°.

In the embodiment of FIG. 2, the first lens group G1 further includes a second lens element (L2) having at least one aspheric surface. The aspheric surface of the present exemplary embodiment can help reduce distortion effects, while still providing a large field of view. In one aspect, the second lens element can be fabricated from an optical polymer having a refractive index of about 1.49 and an Abbe number of about 57.2, such as polymethyl methacrylate (PMMA). The shape of the aspheric surface can be defined by the equation below:

$$Z = \frac{cr^2}{1+\sqrt{1-(1+k)c^2r^2}} + \alpha_2 r^2 + \alpha_4 r^4 + \alpha_6 r^6 + \alpha_8 r^8 + \alpha_{10} r^{10} \quad \text{Equation I}$$

where

Z is the surface sag at a distance r from the optical axis of the system c is the curvature of the lens at the optical axis in $$\frac{1}{mm}$$

r is the radial coordinate in mm k is the conic constant $\alpha_2$ is the coefficient for second order term, $\alpha_4$ is the coefficient for fourth order term, $\alpha_6$ is the coefficient for sixth order term, $\alpha_8$ is the coefficient for eighth order term, and $\alpha_{10}$ is the coefficient for tenth order term.

In another embodiment, the second surface of the first element of the first lens group has a radius of curvature substantially equal to the radius of curvature of the first surface of the second lens element in the first lens group.

In one embodiment, the first lens group G1 includes two meniscus shaped, nested lens elements, a first meniscus shaped element made of glass and a second meniscus shaped element made of plastic, with controlled thickness on the plastic element. A plastic such as PMMA can be used. The two elements are spaced apart such that the ratio of the distance between the second surface of the first element and the first surface of the second element to the overall effective focal length of the projection lens is 1/175.

In an exemplary embodiment, the second shaped element comprises an aspheric lens (e.g., a lens having at least one aspheric surface) having a substantially uniform thickness throughout. This dome-shaped design can reduce thermal problems and can provide for straightforward manufacturing.

In an alternative embodiment, the first lens group G1 can comprise two shaped elements molded together to form one integral element. For example, the first shaped element can comprise a glass element and the second shaped element can comprise a plastic (e.g., PMMA) element molded onto the second surface of the first shaped element.

In another alternative, the first lens group G1 can comprise a single element (e.g., a single glass element), with an aspheric surface formed on the first surface, second surface, or both surfaces of the single element.

In another exemplary embodiment, the second lens group G2 can be of substantially zero refractive power. The second lens group can be formed of a plurality of lens elements. The aperture stop of the projection lens 66 can lie within or near the second lens group. For example, in one embodiment, referring to FIG. 2, the aperture stop is provided at about L5.

In an exemplary embodiment, all lens elements in the second lens group can have spherical surfaces. In one exemplary embodiment, the second lens group G2 includes a cemented triplet to help control spherical aberration and coma. The on-axis spacing between the lens elements in G1 and the lens elements in G2 can be varied, if desired.

In an exemplary embodiment, the second lens group G2 provides a longer effective focal length. In addition, in an exemplary embodiment, the elements that make up the second lens group are formed from glass.

In an alternative embodiment, a doublet can be used for the second lens group G2. In this alternative embodiment, one or both of the doublet elements can include an aspheric surface.

In another exemplary embodiment, the third lens group G3 can be of positive refractive power and all lens elements in this lens group can have spherical surfaces. In an exemplary embodiment, the third lens group G3 provides color aberration correction (i.e., primary and secondary dispersion compensation). For example, lenses L7, L8, L10, and L11 can comprise the same glass material, e.g., MP 52. Alternatively, other glasses may also be utilized.

A prism (e.g., a TIR prism, not shown) can be disposed between the third lens group G3 and the imager 64, for example, at a location furthest away from the screen side. Alternatively, a field lens can be utilized.

By way of example, for the embodiment shown in FIG. 2, Table 1 below lists the surface number, in order from the screen side (with surface 1 being the surface closest to the screen side of the first lens element L1), the curvature (c) near the optical axis of each surface (in 1/millimeters), the on axis spacing (D) between the surfaces (in millimeters), and the glass type is also indicated. One skilled in the art will recognize that from the glass type, it is possible to determine the index of refraction and Abbe number of the material. Surface 0 is the object surface or the surface of the projection screen. In this embodiment, the wide-angle projection lens has an effective overall focal length of 8.8 mm, a half field angle of 55° in the direction of the screen side and operates at F/2.8. The first lens group G1 has an effective focal length of −25.4 mm; the second lens group G2 has an effective focal length of −800 mm; and the third lens group G3 has an effective focal length of 23.5 mm. The projection lens has a total track of 130 mm in this exemplary embodiment.

For the embodiment in FIG. 2, the second surface of the second lens element in the first lens group (denoted as surface 4 in Table 1) is aspheric, as governed by Equation 1 above, and has the following values for the coefficients: c=0.0901, k=−0.8938, $\alpha_2$=0, $\alpha_4$=1.99×$10^{-5}$, $\alpha_6$=−7.468×$10^{-8}$, $\alpha_8$=3.523×$10^{-10}$, and $\alpha_{10}$=−5.970×$10^{-13}$. The wide-angle projection lens of the embodiment of FIG. 2 has a total track distance of 130 mm. As one skilled in the art will appreciate, in certain applications, such as front-projection display applications, it can be advantageous to have a short total track distance because it would result in a compact projection lens thus minimizing the space requirements of the overall optical engine.

TABLE 1

| Surface No. | C ($mm^{-1}$) | D (mm) | Glass Type |
|---|---|---|---|
| 0 | 0 | 755 | |
| 1 | 0.0143 | 3.00 | SK16 |
| 2 | 0.0397 | 0.05 | |
| 3 | 0.0397 | 4.00 | Plastic |
| 4* | 0.0901 | 35.7 | |
| 5 | 0.0134 | 1.87 | N-LAF34 |
| 6 | 0.110 | 7.20 | F2 |

TABLE 1-continued

| Surface No. | C (mm$^{-1}$) | D (mm) | Glass Type |
|---|---|---|---|
| 7 | −0.0796 | 2.00 | N-LAF34 |
| 8 | −0.0214 | 6.78 | |
| 9 | −0.0124 | 2.33 | N-LAK8 |
| 10 | 0.0117 | 1.49 | |
| 11 | −0.0148 | 5.35 | N-PK52 |
| 12 | −0.0553 | 0.187 | |
| 13 | 0.0178 | 9.48 | N-PK52 |
| 14 | −0.0365 | 0.187 | |
| 15 | 0.0110 | 2.40 | PBH6 |
| 16 | 0.0486 | 11.5 | N-PK52 |
| 17 | −0.00866 | 0.187 | |
| 18 | 0.0313 | 5.99 | N-PK52 |
| 19 | 0.00432 | 2.69 | |
| 20 | 0 | 23.4 | BK7 |
| 21 | 0 | 1.00 | |
| 22 | 0 | 3.00 | FK5 |
| 23 | 0 | 0.480 | |
| 24 | 0 | 0 | |

Tables 2 and 3 below list the general lens data and the surface data summary for the embodiment of FIG. 2.

TABLE 2

GENERAL LENS DATA:

| Surfaces | 24 |
|---|---|
| Stop | 8 |
| System Aperture | Image Space F/# −3 |
| Glass Catalogs | schott_2000 OLD_SCHO OHARA CORNING OLD_OHAR MISC |

TABLE 2-continued

GENERAL LENS DATA:

| Ray Aiming | Real Reference, Cache On |
|---|---|
| X Pupil Shift | 0 |
| Y Pupil Shift | 0 |
| Z Pupil Shift | 0 |
| Apodization | Uniform, Factor = 1.00000E+000 |
| Effective Focal Length | 8.806583 (in air) |
| Effective Focal Length | 8.806583 (in image space) |
| Back Focal Length | 0.4613371 |
| Total Track | 130.237 |
| Image Space F/# | 3 |
| Paraxial Working F# | 3.000816 |
| Working F/# | 2.995898 |
| Image Space NA | 0.1643555 |
| Object Space NA | 0.001891026 |
| Stop Radius | 4.013512 |
| Paraxial Image Height | 13.4 |
| Paraxial Magnification | −0.01134926 |
| Entrance Pupil Diameter | 2.935528 |
| Entrance Pupil Position | 21.1718 |
| Exit Pupil Diameter | 122.5057 |
| Exit Pupil Position | −367.5356 |
| Field Type | Paraxial Image height in millimeters |
| Maximum Field | 13.4 |
| Primary Wave | 0.55 |
| Lens Units | Millimeters |
| Angular Magnification | 0.02396238 |

TABLE 3

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 2361.387 | 0 |
| 1 | STANDARD | 148-2A | 69.7004 | 3 | SK16 | 70 | 0 |
| 2 | STANDARD | | 25.176 | 0.05 | | 47.55672 | 0 |
| 3 | STANDARD | 20A | 25.176 | 4 | 1.491000, 57.200000 | 48 | 0 |
| 4 | EVENASPH | | 11.09472 | 35.68789 | | 38 | −0.8938386 |
| 5 | STANDARD | 449-1B | 74.447 | 1.866667 | N-LAF34 | 17 | 0 |
| 6 | STANDARD | NEW | 9.0968 | 7.2 | F2 | 13.5 | 0 |
| 7 | STANDARD | 46-1 | −12.5675 | 2 | N-LAF34 | 13.5 | 0 |
| STO | STANDARD | 565-1B | −46.676 | 6.775973 | | 13.5 | 0 |
| 9 | STANDARD | 169-3A | −80.8308 | 2.333333 | N-LAK8 | 24 | 0 |
| 10 | STANDARD | NEW | 85.79379 | 1.491645 | | 21.2 | 0 |
| 11 | STANDARD | 650-1A | −67.755 | 5.352434 | N-PK52 | 21.2 | 0 |
| 12 | STANDARD | 588-1B | −18.0787 | 0.1866667 | | 24 | 0 |
| 13 | STANDARD | 116-2A | 56.217 | 9.481976 | N-PK52 | 32 | 0 |
| 14 | STANDARD | 700-1B | −27.3991 | 0.1866667 | | 32 | 0 |
| 15 | STANDARD | 665-1B | 91.167 | 2.4 | PBH6 | 33 | 0 |
| 16 | STANDARD | 11A | 20.5695 | 11.47223 | N-PK52 | 33 | 0 |
| 17 | STANDARD | 463-1B | −115.465 | 0.1866667 | | 33 | 0 |
| 18 | STANDARD | 35B | 32 | 5.992456 | N-PK52 | 34 | 0 |
| 19 | STANDARD | 331-1A | 231.217 | 2.692432 | | 34 | 0 |
| 20 | STANDARD | | Infinity | 23.4 | BK7 | 30.90276 | 0 |
| 21 | STANDARD | | Infinity | 1 | | 27.53016 | 0 |
| 22 | STANDARD | | Infinity | 3 | FK5 | 27.31099 | 0 |
| 23 | STANDARD | | Infinity | 0.48 | | 26.87009 | 0 |
| IMA | STANDARD | | Infinity | | | 26.76488 | 0 |

The data provided in the Tables above represent one example and are not intended to limit the scope of the invention described herein.

Figure 3:
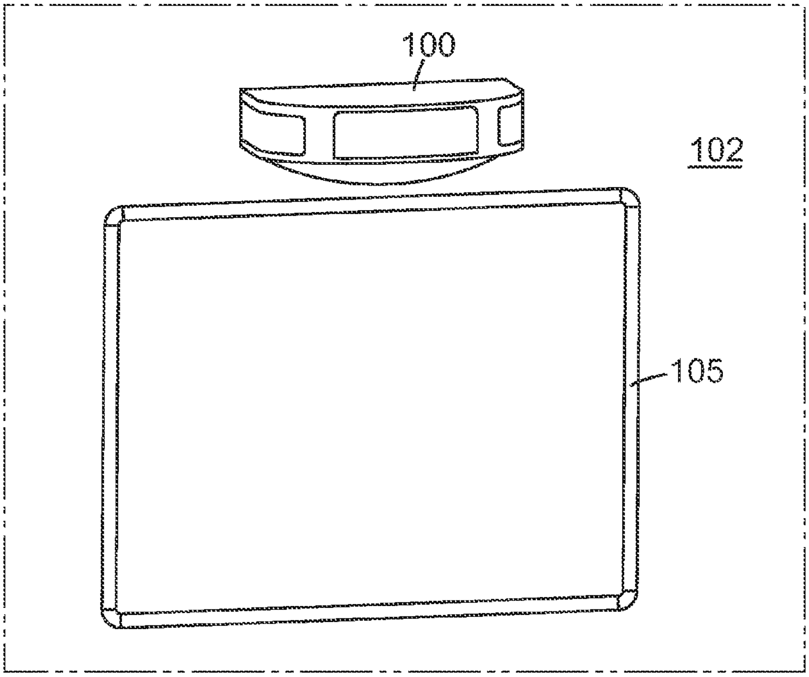
FIG. 3 is a schematic representation of a wall-mounted projection system utilizing the exemplary optical engine.

The optical engine described above can be utilized in a variety of front projection applications. For example, FIG. 3 shows one exemplary embodiment, a wall-mounted projection system utilizing the exemplary optical engine described above. A projector wall mount unit 100, which includes an optical engine such as described above, can be mounted to a wall or other structure 102 using conventional mounting bolts or the like. Unit 100 shown in FIG. 3 is in a closed position. When operated, a movable member (e.g., a sliding tray, sliding arms, telescopic arm(s), threaded rod(s), or the like) emerges from unit 100 at a distance from screen 105, upon which an image can be viewed. Screen 105 can be constructed in a manner such as that described above. Screen 105 can alternatively be constructed as a digital whiteboard, such as described in U.S. Pat. No. 6,179,426. Alternatively, wall mount unit 100 can be mounted on a different wall (e.g., a side wall) from the screen 105.

Figure 13:
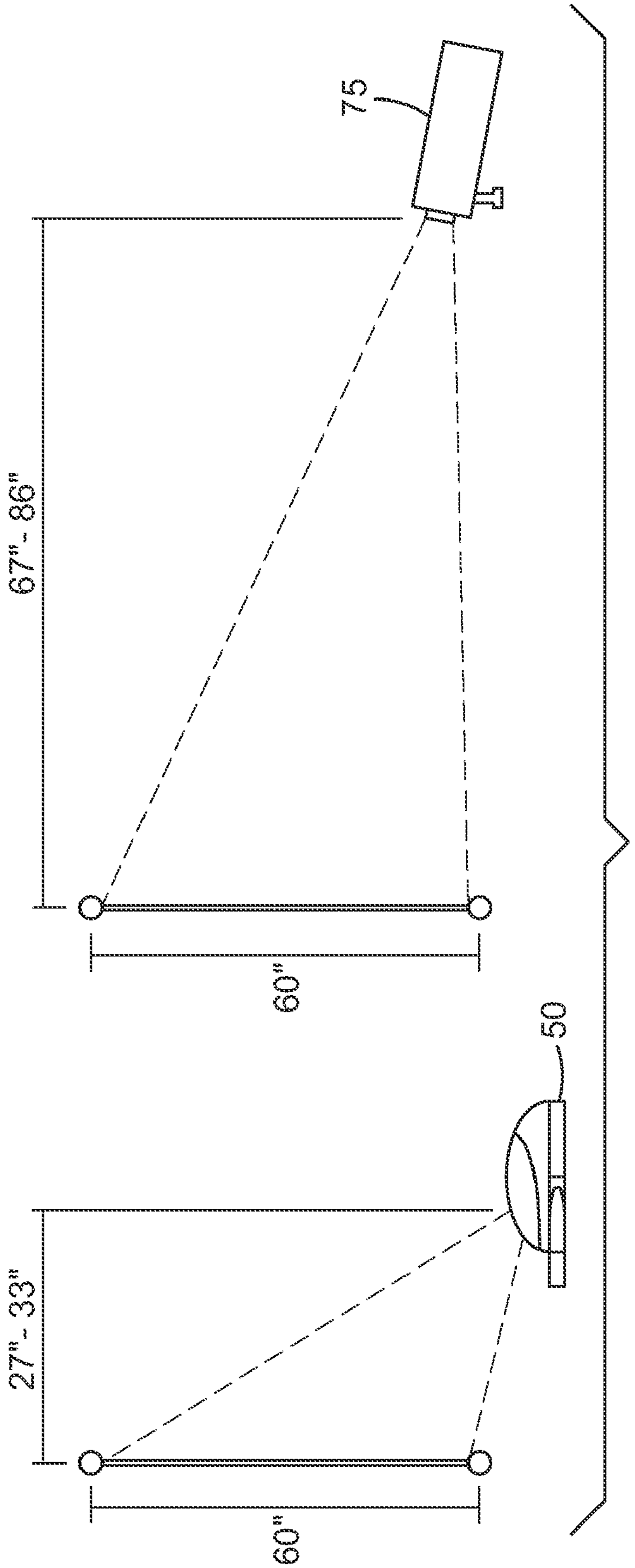
FIG. 13 shows an illustration of the short throw distance achieved by the exemplary optical engine versus a conventional front projector.

Due to the large field of view of the optical engine described herein, unit 100 can provide a large image size at a short throw distance. FIG. 13 shows an illustrative comparison between a projection unit 50, which includes an exemplary optical engine such as described above, and a conventional projector 75. As shown in FIG. 13, an exemplary optical engine (here implemented in a table top projector 50) can be placed at a relatively short distance (e.g., 27-33 inches) from the viewing screen or surface to produce a 60 inch image size (as measured diagonally). Thus, in one exemplary embodiment, the ratio of the distance from the viewing screen to the image size (diagonal, 4×3 format) can be about 1 to 1.8-2.2. As shown in FIG. 13, as a comparison, a conventional projection system 75 has a ratio of the distance from the viewing screen to the image size (diagonal, 4×3 format) of about 1 to 0.7-0.9. The terms "4×3 format" and "16×9 format" refer to conventional image formats as measured by the image width versus the image height.

For example, for an image size of about 40 inches (diagonal, 4×3 format), the optical engine is placed at a distance from the screen of about 18-22 inches. For a 60 inch (diagonal, 4×3 format) image size, the optical engine is placed at a distance from the screen of about 27-33 inches. Of course, the exemplary optical engine described herein can provide an image size of greater than 60 inches (diagonal, 4×3 format), if necessary, using a relatively short throw distance at an extreme off-axis position. In a preferred embodiment, the image size is at least about 25 inches.

In addition, the optical engine is designed so that little or no keystone correction is necessary, while distortion is reduced. For example, distortion values for the projected image can be less than or equal to 2%, preferably less than or equal to 1.0%, and more preferably less than or equal to 0.5% (e.g., where distortion (d) can be determined by: $d=(H-h)/h*100$, where h is the paraxial image height and H is actual image height). In one exemplary embodiment, the optical engine can provide an image having a 4×3 format. In another exemplary embodiment, the optical engine can be implemented with a suitable imager to provide a different screen format, such as a 16×9 format.

Alternatively, the optical engine can be implemented with correction circuitry (e.g., a conventional warp chip), which can result in sufficient image quality at even shorter throw distances.

Figure 4A:
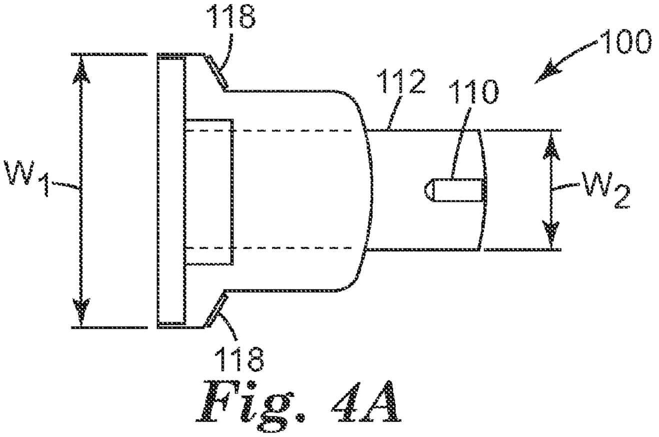
FIGS. 4A-4C are more detailed views of the wall-mount unit of the projection system of FIG. 3.
Figure 4B:
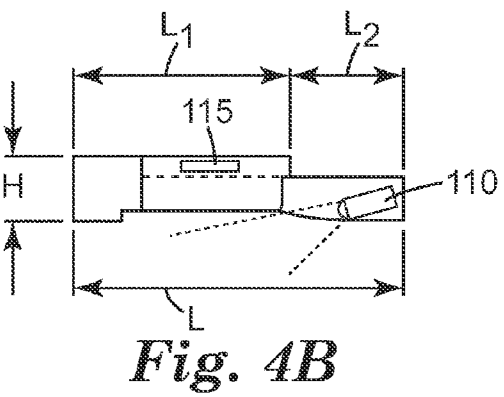
Figure 4C:
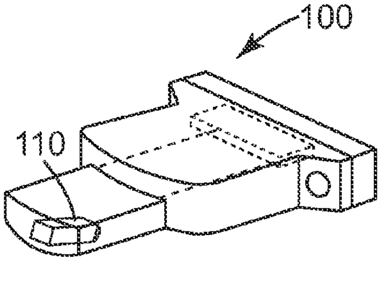

FIGS. 4A, 4B, and 4C show more detailed views of exemplary projection unit 100.

FIG. 4A is a top view of unit 100. Unit 100 can be constructed from metallic and/or lightweight materials such as aluminum, magnesium, and/or plastic composites, in order to reduce the overall weight. The unit can have an overall width (W1) of about 24-36 inches. The optical engine 110 can reside in a movable member or tray 112, which can have a width (W2) of about 12-16 inches. All projection system physical dimensions described herein are illustrative and are not intended to be limiting.

Movement can be provided to tray 112 through the use of conventional translation mechanisms, such as tray 112 being coupled to a threaded rod that is translated to a fixed or adjustable position. The optical engine 110 is positioned with tray 112 such that when placed in use (i.e., an open position), the optical image projects an image on a screen, such as screen 105. In addition, unit 100 can further include further audio/visual components, such as speakers 118, input/output jacks (not shown), and a control panel (not shown). Further cabling (such as to provide power and the image signal to the optical engine) can extend through the back end of unit 100 into the wall, so as to keep such cabling out of sight from the viewer.

As shown in FIG. 4B, the unit 100 can have a height (H) of about 6-10 inches. In addition, unit 100 has a closed length (L1) of about 14-20 inches, where the movable tray which houses optical engine 110 can extend out by a length (L2) of about 6-20 inches, thus providing an overall length (L) of about 20-40 inches, depending on the size of the image to be projected onto the screen. In one exemplary embodiment, movable tray 112 can extend out to two or more different fixed or adjustable positions, thus providing two or more different image sizes on the screen. Focusing by the user can be optionally provided.

For example, for a 40 inch diagonal image size, the optical engine can be placed at a distance of about 18-22 inches from the screen, and for a 60 inch diagonal image size, the optical engine can be placed at a distance of about 27-33 inches from the screen.

In addition, unit 100 can include additional electronics 115, air cooling components, a power supply, and/or a focusing mechanism. Preferably, these additional components are distributed throughout the body of unit 100 and tray 112 to minimize load effects when in operation. FIG. 4C provides a schematic side view of unit 100 in an open position.

Figure 5B:
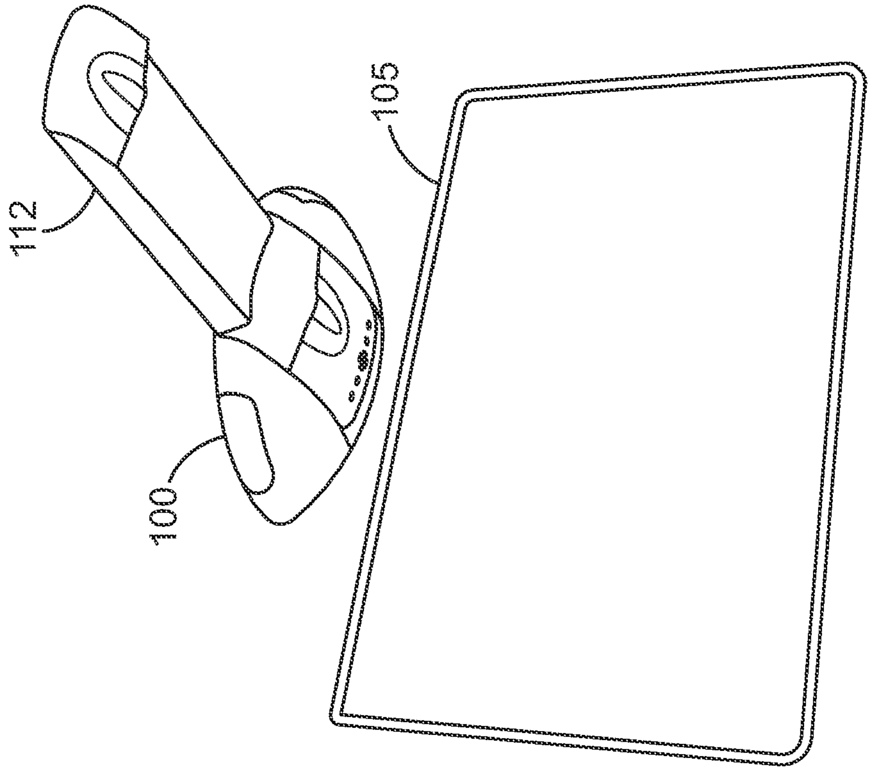
FIGS. 5A and 5B show a design of an exemplary wall mount unit in a closed position and in an open position, respectively.
Figure 5A:
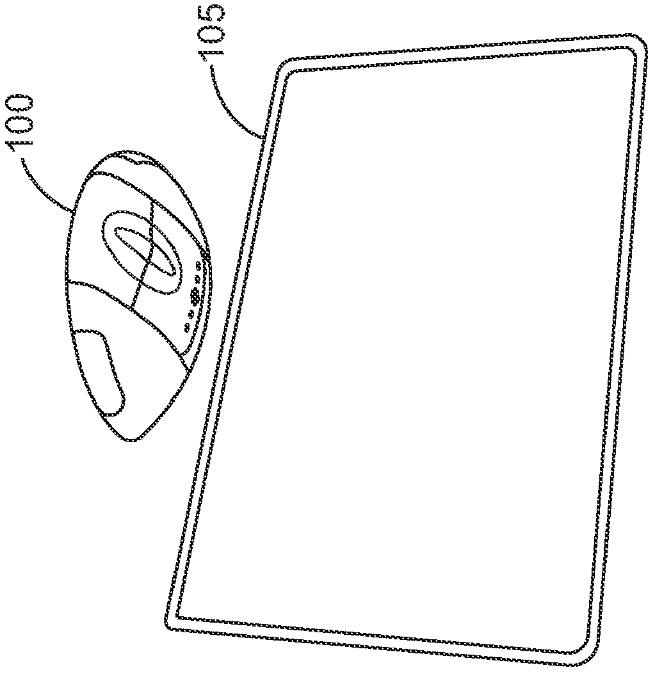

FIGS. 5A and 5B show an exemplary design of a wall mount unit 100, similar to that described above with respect to FIGS. 4A-4C, in a closed position (FIG. 5A) and in an open position (FIG. 5B). As is shown in FIG. 5B, because of the extreme off axis imaging capabilities of the optical engine, the extension of the optical engine tray 112 can be kept to a shorter distance than is found in conventional overhead projectors. In use, an operator can activate the imaging unit to one or more set screen sizes. The sliding tray is then activated and positions the optical engine at a set distance from the screen corresponding to the image size selected. Focusing can be performed manually by the operator, through the use of a remote control device, or automatically with a conventional auto-focus mechanism.

Figure 6:
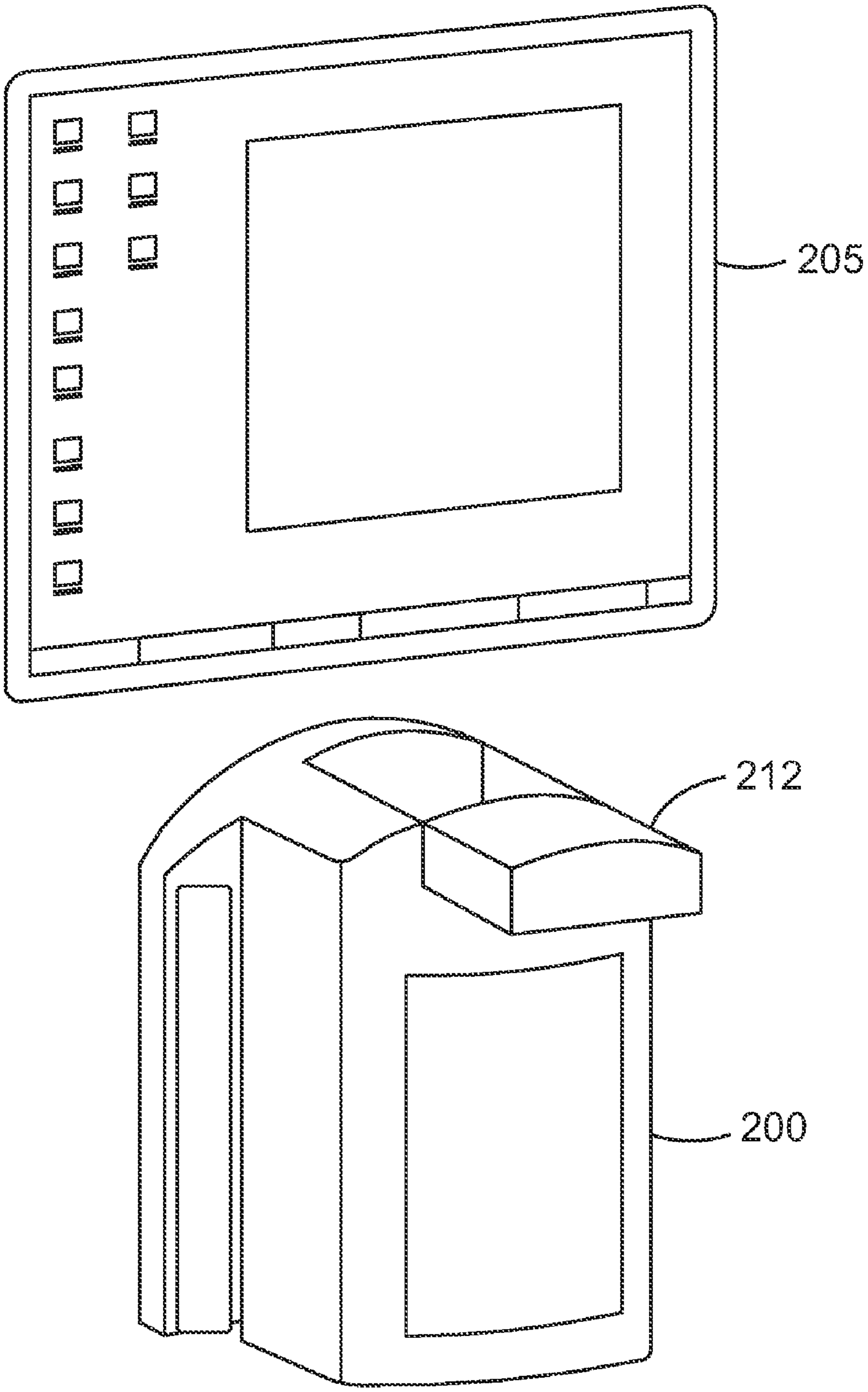
FIG. 6 is a schematic representation of an exemplary integrated multimedia system utilizing the exemplary optical engine.

According to yet another embodiment of the present invention, FIG. 6 is a schematic representation of an exemplary integrated multimedia system 200 utilizing the exemplary optical engine described above. The multimedia system 200 can include multiple media devices (e.g., computer, DVD player, CD player, VCR player, cable/satellite/television receiver, speaker, etc.). In addition, an exemplary optical engine can reside in movable member (e.g., sliding tray) 212. The sliding tray can be placed at one or more positions, depending on the image size to be viewed on the screen 205. Cabling can extend through the back end of multimedia system 200 into the wall, if needed.

Figure 7A:
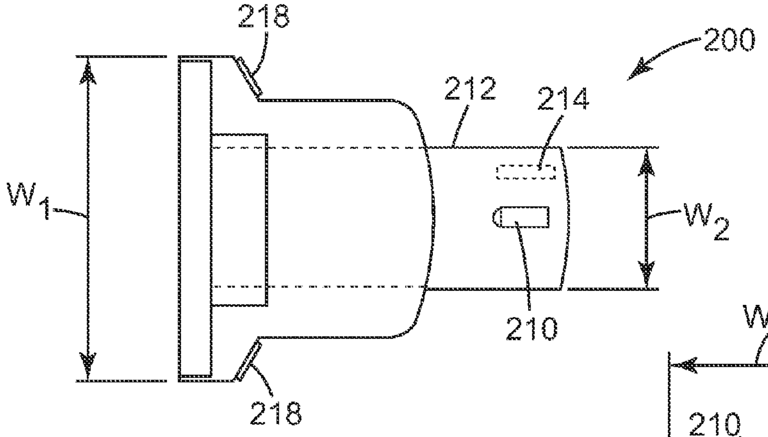
FIGS. 7A-7D show more detailed views of the multimedia system of FIG. 6.

FIGS. 7A-7D show more detailed views of exemplary multimedia system 200. A top view of an exemplary multimedia system 200 is shown in FIG. 7A. The body of multimedia system 200 can be constructed from metallic and/or lightweight materials such as aluminum, magnesium, and/or plastic composites. The system 200 can have an overall width (W1) of about 24-36 inches. The optical engine 210 can reside in a movable member or tray 212, which can have a width (W2) of about 12-16 inches. The optical engine 210 is positioned with tray 212 such that when placed in use (i.e., an open position), the optical image projects an image on a screen, such as screen 205. Tray 212 can also house electronics unit 214, which can include control boards, ballast, drive circuitry, and/or other electronic components. In addition, multimedia system 200 can further include speakers 218.

Figure 7B:
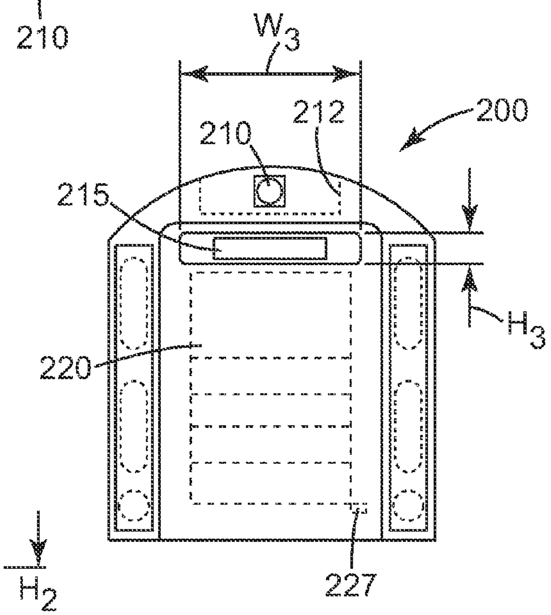

FIG. 7B shows a rear view of multimedia system 200, which includes sliding tray 212 and audio/visual component compartment 220. In addition, power supply and/or control electronics 215, which can reside in a separate compartment, having a width (W3) of about 14-20 inches, can be coupled to the optical engine 210. A connector port 227 can also be provided.

Figure 7C:
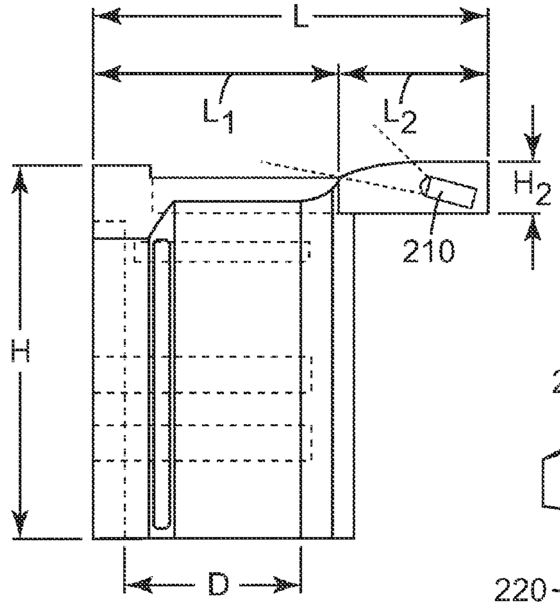

FIG. 7C shows a side view of the exemplary multimedia system 200. The height (H) of the unit can be about 30-40 inches and the depth (D) of the main multimedia components compartment can be about 16-24 inches. In addition, multimedia system 200 has a closed length (L1) of about 14-24 inches, where the movable tray which houses optical engine 210 can extend out by a length (L2) of about 4-20 inches, thus providing an overall length (L) of about 20-40 inches, depending on the size of the image to be projected onto the screen.

Figure 7D:
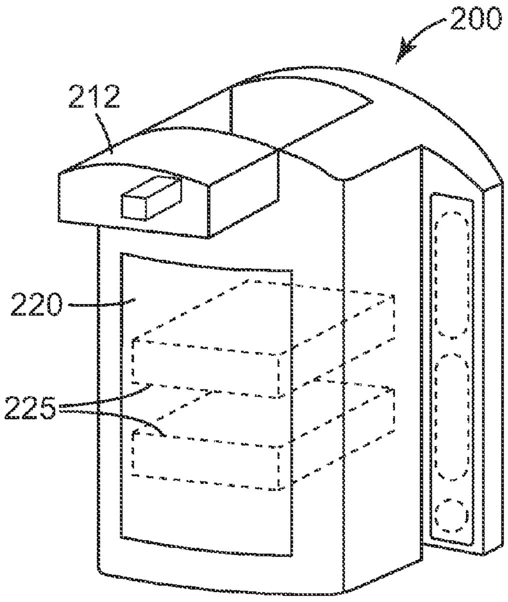

FIG. 7D provides a perspective view of the multimedia system 200, where one or more A/V components 225, such as a computer, a DVD player, a CD player, a VCR player, a cable/satellite/television receiver, etc., can reside within compartment 220.

Figure 8A:
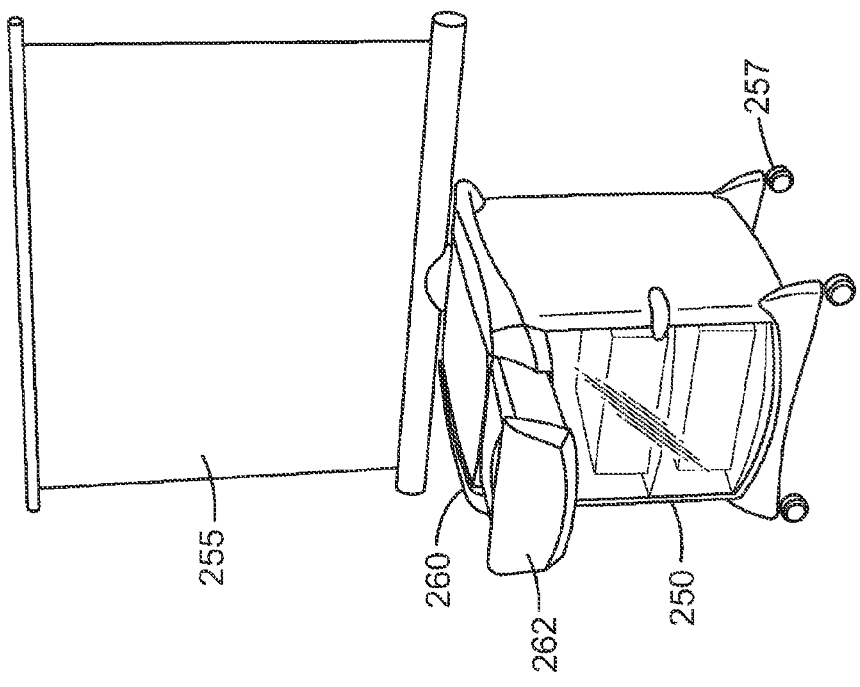
FIGS. 8A and 8B show an alternative embodiment of a multimedia system.
Figure 8B:
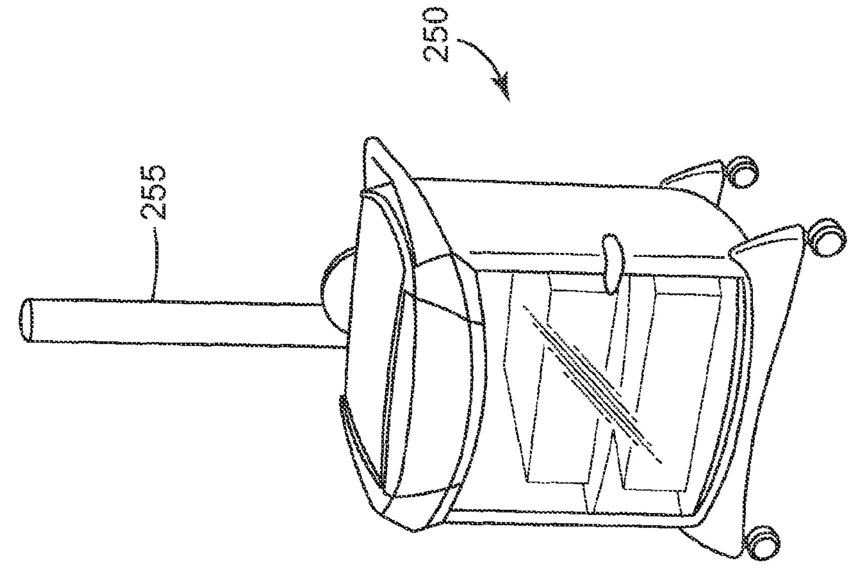

FIGS. 8A and 8B show an alternative exemplary embodiment, multimedia system 250. In this alternative embodiment, an exemplary optical engine 260 can reside in a movable member or sliding tray unit 262, such as described above. In addition, the multimedia system 250 can include a screen unit 255 that is attached to the multimedia system body via a conventional pivoting or rotatable clamping/fastening mechanism (not shown). In addition, wheels or rollers 257 can be provided to allow for greater portability of the multimedia system 250. The overall operation of the imaging system can be similar to that described above. Further, the multimedia system can house one or more A/V components, such as a computer, a DVD player, a CD player, a VCR player, a cable/satellite/television receiver, etc., such as described above. In FIG. 8A, the screen unit 255 is open for operation, whereas in FIG. 8B, the screen unit 255 is placed in a closed and rotated position.

Figure 9B:
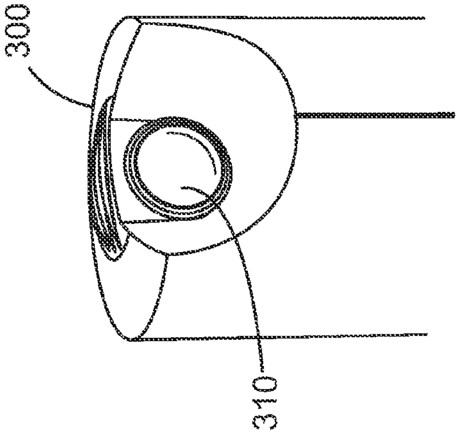
FIGS. 9A and 9B show another alternative embodiment of a multimedia system.
Figure 9A:
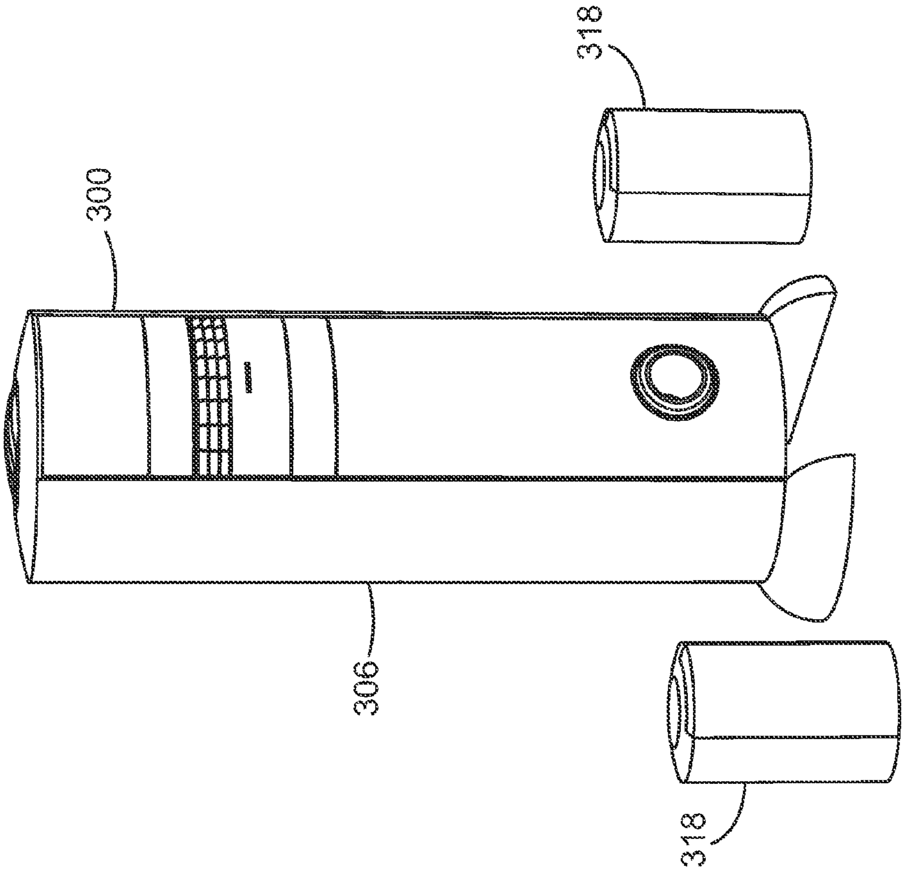

FIGS. 9A and 9B show yet another alternative implementation of the optical engine of the present invention, a multimedia/home theater system 300. In this alternative embodiment, an optical engine 310, such as that described above, is housed in a tower structure 306. The structure can be placed at an angle with respect to the screen (not shown), and at a short distance from the screen. The image is output through the rear side of the tower structure, such as is shown in FIG. 9B. The tower can include the A/V components described above and can operate as a multimedia center or a home theater. Speakers 318 can be part of the tower unit or can be provided separately, as is shown in FIG. 9A. The overall operation of the imaging system can be similar to that described above.

Figure 10A:
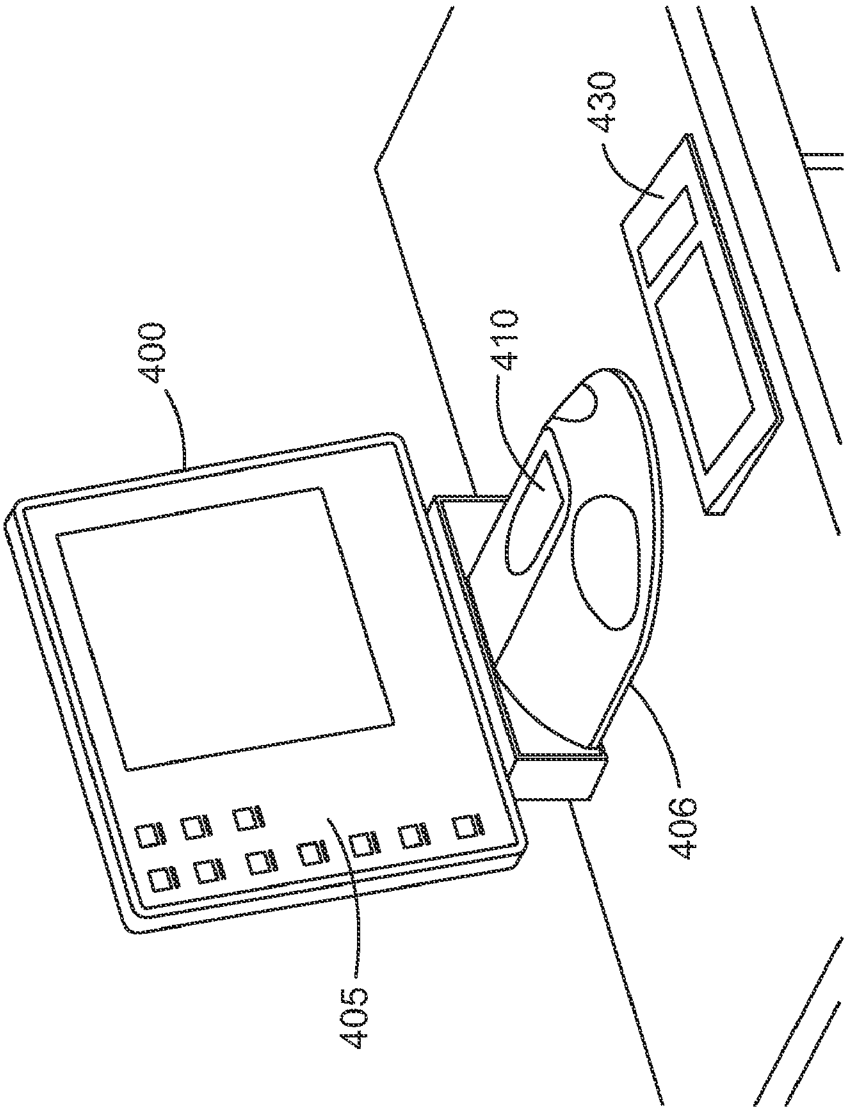
FIG. 10A shows a schematic representation of a compact integrated monitor system utilizing the exemplary optical engine and FIGS. 10B-10D shown an alternative embodiment of the compact integrated monitor system.

FIG. 10A shows yet another alternative implementation of the optical engine of the present invention, a compact integrated monitor system 400. In this embodiment, an optical engine 410, similar to that described above, is housed in a base unit 406. A screen 405 can be attached to the base unit 406. Alternatively, screen 405 can be detached from base unit 406. In a further alternative embodiment, optical engine 410 can project an image on a wall other structure. Base unit 406 can include control boards, ballast, cooling components, drive circuitry, and/or other electronic components. Optionally, base unit 406 can also include personal computer components (motherboard, disk drives, video/sound cards, etc.). Alternatively, base 406 can include connections and/or adapters to connect the monitor system to a stand-alone or laptop computer (not shown).

Figure 10B:
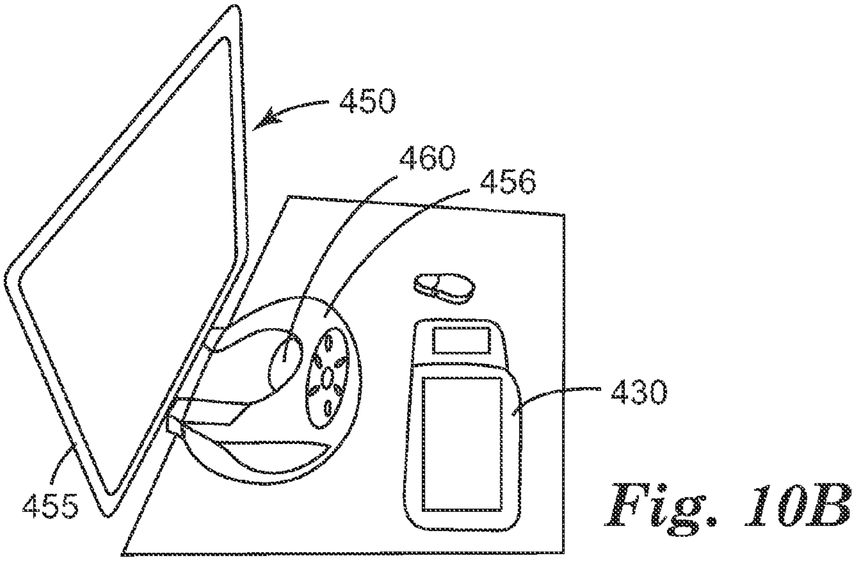
Figure 10C:
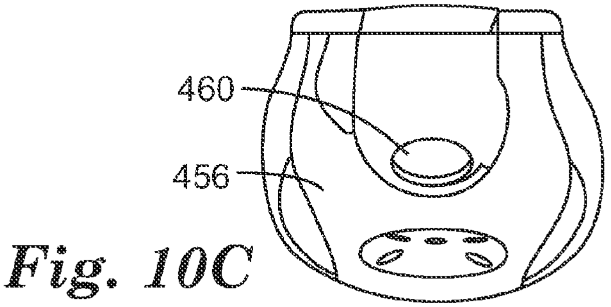
Figure 10D:
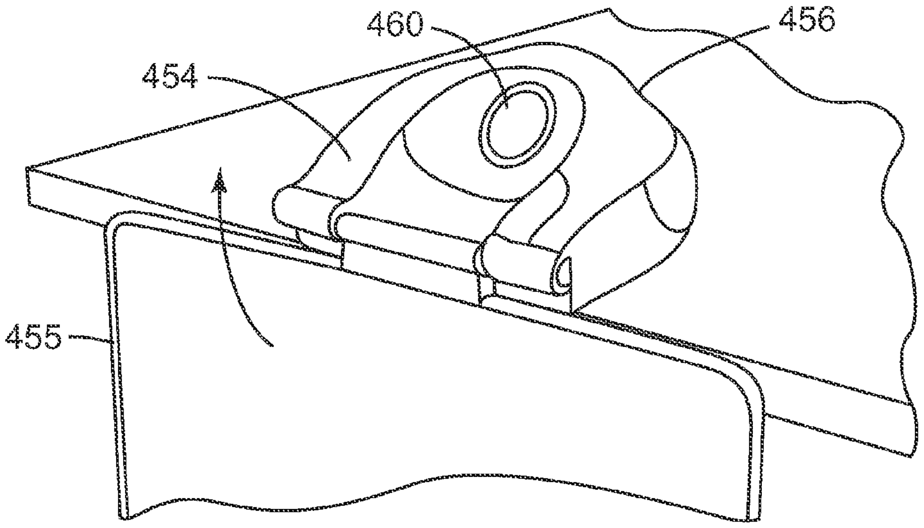

FIGS. 10B-10D show an alternative construction of a compact integrated monitor system 450. In FIG. 10B, base unit 456, which includes optical engine 460, as well as one or more of the electronic components described above with respect to base unit 406, projects an image on screen 455, which is coupled to the base unit 456. In this alternative embodiment, screen 455 is coupled to base unit 456 via a rotational mount 454. This rotational mount can place the screen into variable positions, including an in-use position (see FIG. 10B) or a not-in-use position (see FIG. 10D). FIG. 10C shows a top perspective view of base unit 456, which can operate in a manner similar to that described above for base unit 406.

In the embodiments shown in FIGS. 10A and 10B, the image size can be at least 25 inches (diagonal), preferably about 30 inches diagonal or greater, thus providing a lower cost alternative to LCD and plasma screens of similar size. The short throw distance, extreme off axis optical engine of the present invention can be placed at a distance of about 13-17 inches from the viewing screen or surface in order to produce a 30 inch diagonal image size. Thus, the desk space required is reduced, allowing sufficient room for additional components, such as a remote keyboard 430, and the like.

Figure 11A:
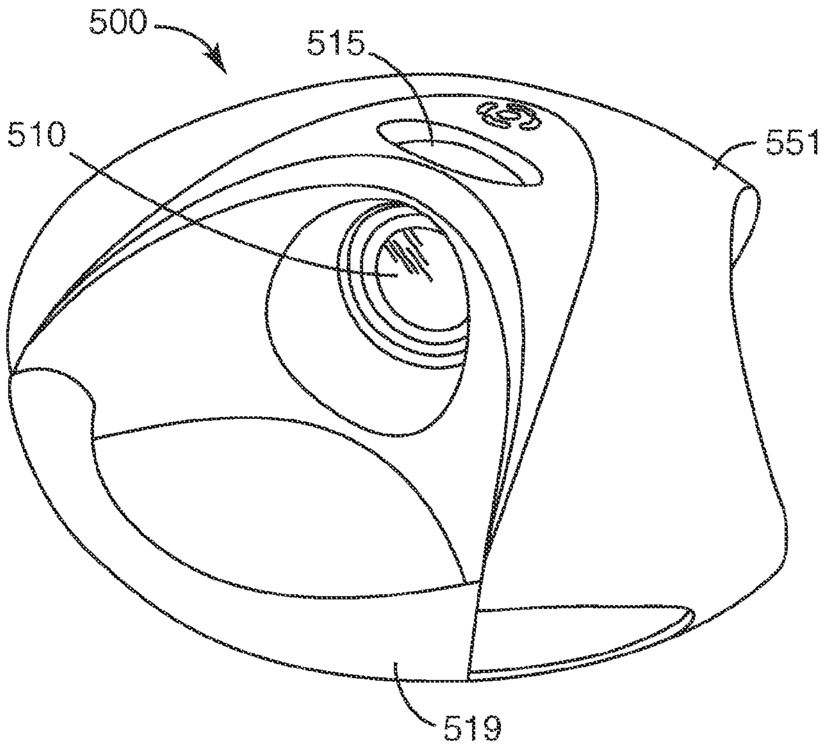
FIGS. 11A and 11B respectively show front and rear perspective views of a portable projection unit according to another embodiment.
Figure 11B:
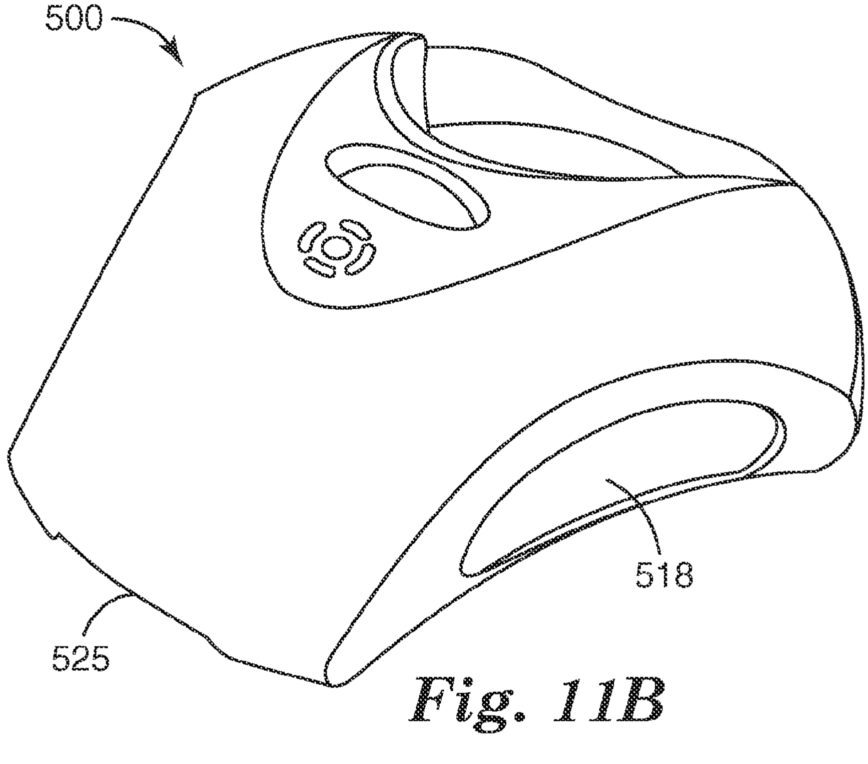

FIGS. 11A and 11B show yet another alternative embodiment of the present invention, a portable projection unit 500. In this embodiment, an optical engine 510, similar to that described above, can be housed in a compact, portable structure 501. The portable unit 500 can be placed on a table top surface a short distance from a viewing screen (not shown) and can provide image sizes of at least 40 inches diagonal. Optionally, the unit 500 can also provide manual focusing 515 and speakers 518. A port 525 is provided for cabling connections to audio/video components. In addition, unit 500 can be provided with a handle 519 for greater portability. The overall operation of the imaging system can be similar to that described above.

Figure 12A:
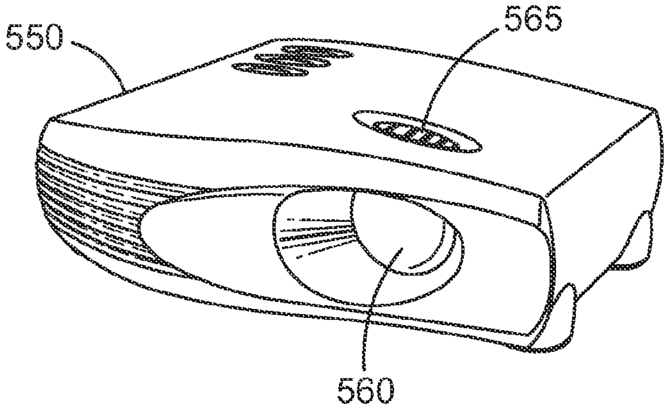
FIGS. 12A-12C show different views of an alternative design for a portable projection unit.
Figure 12B:
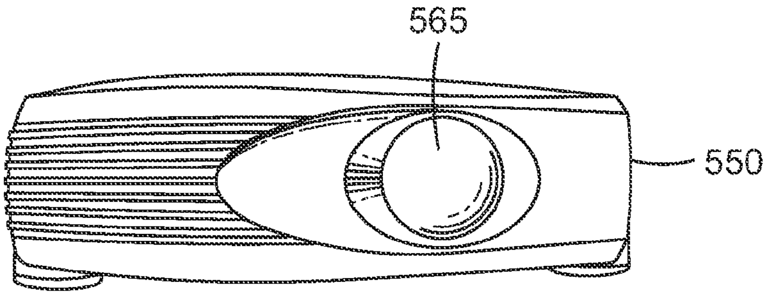
Figure 12C:
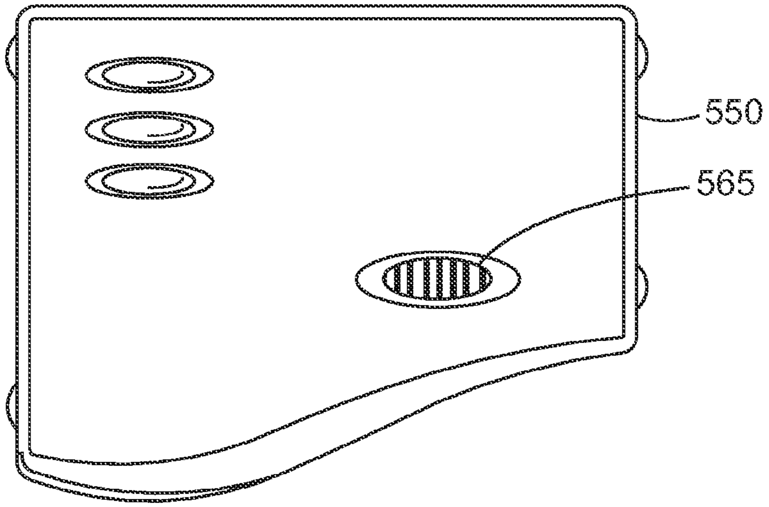

FIGS. 12A-12C show an alternative design for a portable front projection unit 550. In FIG. 12A, a portable projection unit 550 is shown in a perspective view, while FIG. 12B shows a front view and FIG. 12C shows a top view of projection unit 550. The portable unit 550 can be placed on a table top surface a short distance from a viewing screen (not shown) and can provide image sizes of at least 40 inches diagonal. Optionally, the unit 500 can also provide manual focusing 565. The overall operation of the imaging system can be similar to that described above.

The imaging system of the present invention is designed to provide large image sizes from short distances and at extreme off-axis positions in a variety of front projection implementations. In addition, the optical engine described herein is substantially distortion free and requires little to no keystone correction.

Those skilled in the art will appreciate that the present invention may be used with a variety of different optical components. While the present invention has been described with a reference to exemplary preferred embodiments, the invention may be embodied in other specific forms without departing from the scope of the invention. Accordingly, it should be understood that the embodiments described and illustrated herein are only exemplary and should not be considered as limiting the scope of the present invention. Other variations and modifications may be made in accordance with the scope of the present invention.

What is claimed is:

1. A wide-angle projection lens comprising:

(a) a first lens group of negative refractive power, the first lens group having at least one aspheric surface;

(b) a second lens group of substantially zero refractive power and wherein an aperture stop lies within or near the second lens group; and (c) a third lens group of positive refractive power; wherein the following Conditions (1) to (3) are satisfied:

$$|F_1/F|<4.0 \quad \text{Condition (1)}$$

$$|F_2/F|>50 \quad \text{Condition (2)}$$

$$|F_3/F|<3.5 \quad \text{Condition (3)}$$

where F is the focal length of the wide-angle projection lens; $F_1$ is the focal length of the first lens group; $F_2$ is the focal length of the second lens group; and $F_3$ is the focal length of the third lens group.

2. The wide-angle projection lens of claim 1, wherein the first lens group comprises a first and a second lens element, the second lens element including the aspheric surface at a surface facing the second lens group.

3. The wide-angle projection lens of claim 1, wherein the lens is incorporated in a rear projection display system.

4. The wide-angle projection lens of claim 1, wherein the lens has an F/# less than or equal to about F/2.8.

5. The wide-angle projection lens of claim 1, wherein $-3.5<F_1/F<-2.3$, $-95<F_2/F<-86$, and $2.5<F_3/F<3.2$.

6. The wide-angle projection lens of claim 1, wherein the lens has an F/# of less than or equal to about F/3.0 and an effective focal length of about 9 mm.

7. The wide-angle projection lens of claim 1, wherein the first lens group comprises a first meniscus shaped lens element nested with a second meniscus shaped lens element.

8. An optical engine for a display device, comprising:

an illumination system;

an imaging system illuminated by light from the illumination system; and a wide angle projection lens arranged to project an image from the imaging system, the wide angle projection lens projecting the image at a half field angle of at least about 45° , the image having substantially no distortion, the wide angle projection lens comprising a first lens group of negative refractive power and having at least one aspheric surface, and at least a second lens group, the second lens group comprising a plurality of lens elements and being disposed adjacent the first lens group, a ratio of a focal length of the second lens group ($F_2$) to a focal length of the wide angle projection lens (F) lying in the range $|F_2/F|>50$.

9. The optical engine of claim 8, wherein the wide angle projection lens outputs an image at a half field angle of at least about 50° .

10. The optical engine of claim 9, wherein the wide angle projection lens outputs an image at a half field angle of at least about 55° .

11. The optical engine of claim 8, wherein a projected image size is at least 25 inches (diagonal measurement) and requires substantially no keystone correction.

12. The optical engine of claim 8, wherein a projected image format is one of a 4×3 format and a 16×9 format.

13. The optical engine of claim 8, wherein the optical engine is incorporated in a rear projection display system.

14. The optical engine of claim 8, wherein the first lens group comprises a first lens element of negative refractive power and a second lens element having an aspheric surface on a surface facing the second lens group, a ratio of a focal length of the first lens group ($F_1$) to a focal length of the wide angle projection lens lying in the range $-3.5<F_1/F<-2.3$.

15. The optical engine of claim 8, wherein the wide angle projection lens comprises an aperture stop located at about the second lens group.

16. The optical engine of claim 8, further comprising a third lens group having a positive refractive power and including a plurality of lens elements disposed adjacent the second lens group, a ratio of a focal length of the third lens group ($F_3$) to a focal length of the wide angle projection lens lying in the range $2.5<F_3/F<3.2$.

17. The optical engine of claim 8, wherein the first lens group comprises a single element having an aspheric surface formed on at least one of a first and second surface of the single element.

18. The optical engine of claim 8, the wide angle projection lens comprising an aperture stop located within or near the second lens group and further comprising a third lens group of positive refractive power, a ratio of a focal length of the first lens group ($F_1$) over the focal length of the wide angle projection lens having a value in the range $|F_1/F|<4.0$ and a ratio of a focal length of the third lens group ($F_3$) over the focal length of the wide angle projection lens having a value in the range $|F_3/F|<3.5$.

19. The optical engine of claim 8, wherein the first lens group comprises a first lens element of negative refractive power and a second lens element of substantially uniform thickness.

20. The optical engine of claim 8, further comprising image correction circuitry.

21. A projection display device, comprising:

an optical engine including an illumination system, an imaging system, and projection optics that include a first lens group of negative refractive power and having at least one aspheric surface, wherein the projection optics output an image at a half field angle of at least about 45°, wherein the image has substantially no distortion; and a movable member to support the optical engine, wherein the movable member is configured to move the optical engine in a direction perpendicular to a viewing surface, wherein the movable member is extendable at a first distance and a second distance from the viewing surface, the first and second surfaces being different, wherein a ratio of a distance of the first lens group to the viewing surface over a projected image size is 1 to at least 1.8.

22. The display device of claim 21, wherein the ratio is 1 to no more than 2.2.

23. The display device of claim 21, wherein the projection optics output an image at a half field angle of at least about 50° .

24. The display device of claim 23, wherein the projection optics output an image at a half field angle of at least about 55° .

25. The display device of claim 21, wherein the projected image size is at least 25 inches (diagonal measurement) and requires substantially no keystone correction.

26. The display device of claim 21, further comprising a viewing screen and wherein the first distance is about 27 to about 33 inches from the viewing screen, and wherein the projection optics output an image having a diagonal dimension of about 60 inches.

27. The display device of claim 21, wherein the display device is disposed in a multimedia system that further includes at least one of a computer, a DVD player, a CD player, a VCR player, a satellite television receiver, and a cable television receiver.

28. The display device of claim 21, wherein the first lens group comprises a first lens element of negative refractive power and a second lens element of substantially uniform thickness throughout.

* * * * *